United States Patent [19]

Lenhard-Backhaus et al.

[11] Patent Number: 4,591,349

[45] Date of Patent: May 27, 1986

[54] CARDAN SHAFT DRIVE FOR A TRANSMISSION, PARTICULARLY FOR THE DISTRIBUTION TRANSMISSION OF A MOTOR VEHICLE WITH ALL-WHEEL DRIVE

[75] Inventors: Hugo Lenhard-Backhaus; Erhard Kauer, both of Österreich, Austria

[73] Assignee: Steyr-Daimler-Puch Aktiengesellschaft, Vienna, Austria

[21] Appl. No.: 620,895

[22] Filed: Jun. 15, 1984

[30] Foreign Application Priority Data

Jun. 15, 1983 [AT] Austria .................................. 2206/83

[51] Int. Cl.⁴ .......................... F16D 3/06; F16D 3/26
[52] U.S. Cl. .................................. 464/136; 464/112; 464/162
[58] Field of Search ............... 464/106, 112, 125, 126, 464/134, 136, 162

[56] References Cited

U.S. PATENT DOCUMENTS

| 1,157,878 | 10/1915 | Loomis ............................ 464/125 X |
| 1,857,020 | 5/1932 | Hatcher .......................... 464/112 X |
| 1,923,649 | 8/1933 | Warner ........................... 464/125 X |
| 2,064,392 | 12/1936 | Swenson et al. ................. 464/117 X |
| 2,067,286 | 1/1937 | Pearce ............................. 464/118 |
| 4,271,685 | 6/1981 | Lindenthal et al. ............ 464/125 X |

FOREIGN PATENT DOCUMENTS 2613656 10/1977 Fed. Rep. of Germany .
1408856 7/1965 France .

Primary Examiner—Stuart S. Levy
Assistant Examiner—Daniel P. Stodola
Attorney, Agent, or Firm—Marmorek, Guttman & Rubenstein

[57] ABSTRACT

A universal joint transmission for a rearwards gear transmission that has a shaft which is in driving engagement with the interior of the receiving hub of the universal joint, but is movable longitudinally relative to the receiving hub, the transmission including a driving gear hub which is hollow, and which adjoins the receiving hub, its interior forming with the inside of the receiving hub a space in which the shaft extends from the gear hub into the receiving hub, the driving coupling member of the universal joint being in driving connection with the gear hub, the gear hub and a ring member of the coupling device of the universal joint being formed internally flaring outwardly to provide for easy pivoting of the shaft.

2 Claims, 2 Drawing Figures

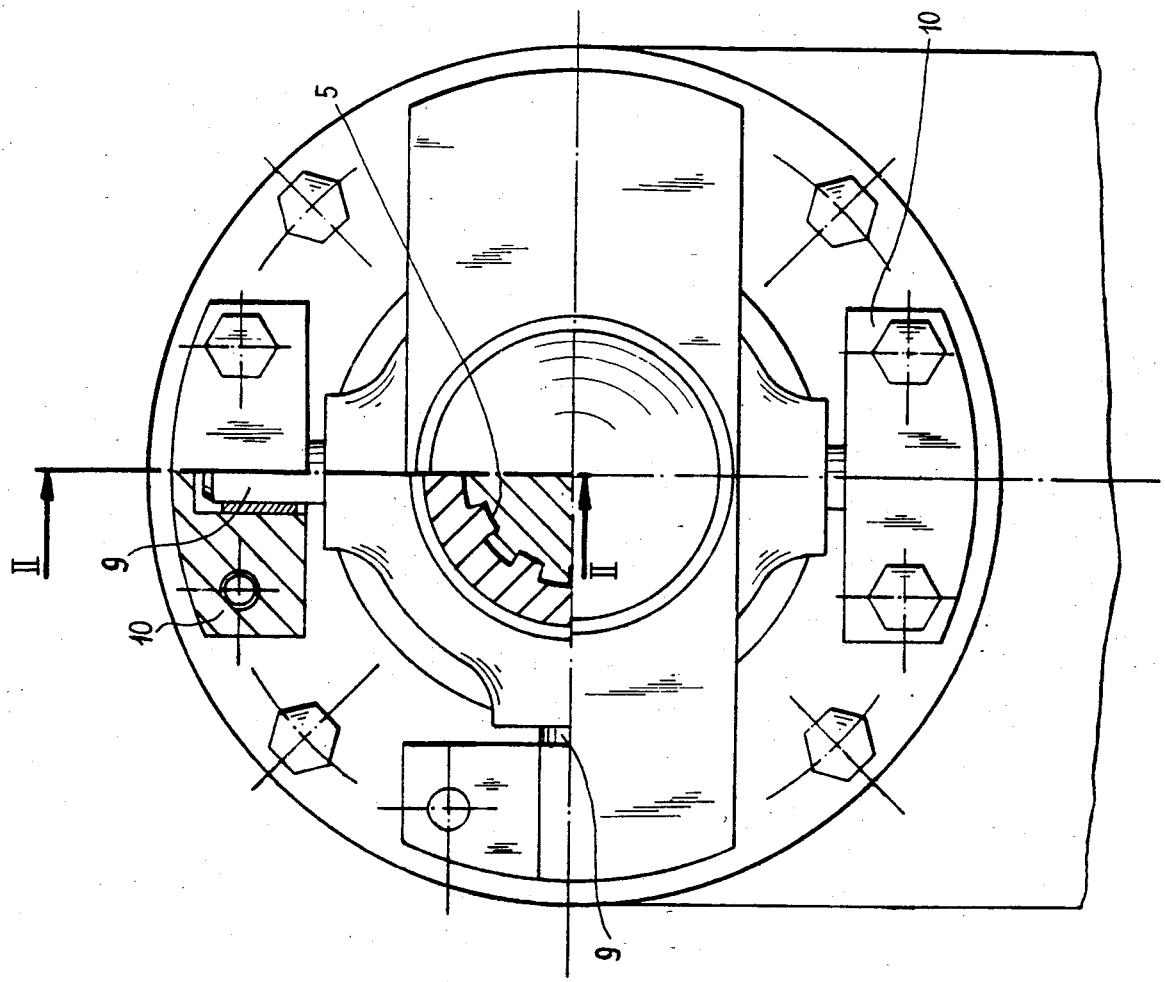

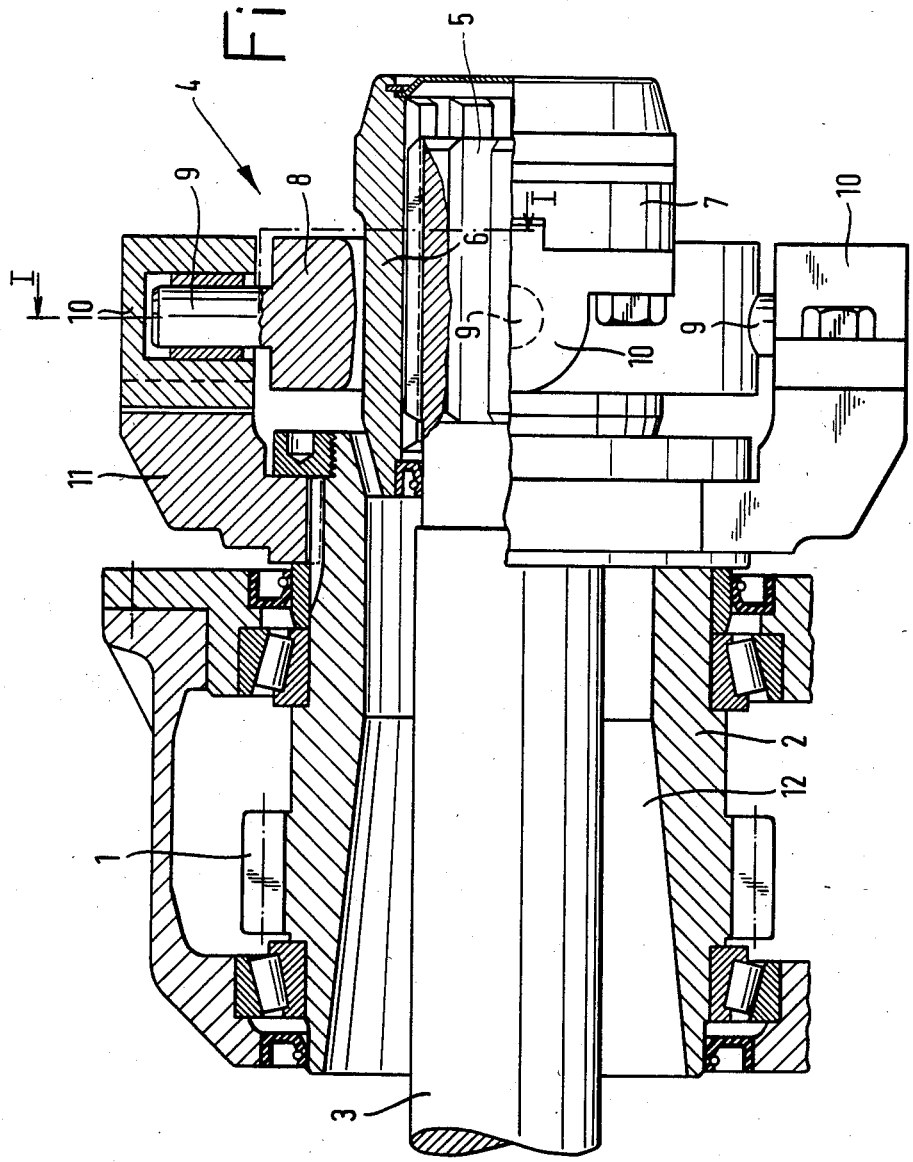

CARDAN SHAFT DRIVE FOR A TRANSMISSION, PARTICULARLY FOR THE DISTRIBUTION TRANSMISSION OF A MOTOR VEHICLE WITH ALL-WHEEL DRIVE

BACKGROUND OF THE INVENTION

The invention relates to a cardan shaft drive for a transmission, in particular, for the distributor gear of a motor vehicle with all-wheel drive, in which the cardan shaft passes through the hollow hub of the drive pinion of the gear and is connected via a cardan joint rearwards to the hub of the drive pinion.

Such a universal drive or cardan shaft drive is already known (DE-OS 2,613,656). Its aim is to obtain, within a comparatively close arrangement of motor and gear block, on the one hand, and distributor gear on the other hand, an adequate length of the cardan shaft. In this case, however, the cardan shaft consists of two portions usually inserted one in the other in telescopic manner and lying within the hollow hub of the drive pinion of the gear, thus requiring a greater hub or pinion diameter. Because of the resulting increased peripheral speed of the meshing gears, a greater pinion diameter leads to a higher noise level and, for a given transmission ratio, to an increase in the overall dimensions and weight of the distributor gear. If the hub inner diameter is reduced in order to reduce the pinion reference diameter, the telescopic cardan shaft will have inadequate clearance within the hollow pinion hub, i.e., the available pivot angle is reduced. Furthermore, in the known construction the driving shaft portion and the returning shaft portion are disposed on the same side, i.e., the gear side, of the cross-like coupling member. Hence the plane of the cross-like coupling member, which includes the pivot axis of the cardan shaft, is therefore relatively remote from the gear, further reducing the available pivot deflection of the cardan shaft within the hollow hub of the drive pinion.

SUMMARY OF THE INVENTION

The invention has an object to obviate these defects and improve the universal drive described above in such a manner that for the smallest possible diameter of the drive pinion a relatively large pivot angle of the cardan shaft can be obtained.

The invention solves this problem by providing that the cardan shaft is made in one piece and is mounted fixed in rotation but longitudinally displaceable in the hub of the driving member of the cardan joint; that the coupling member of the cardan joint consists of a ring which surrounds, and which clears, the cardan shaft or the hub of the driving member, and on which are disposed radial outer studs in cross-like manner; and that the driven member of the cardan joint is disposed on the gear side, of the coupling member.

As the cardan shaft, which passes through the hub of the drive pinion, is made in one piece does not consist of two portions telescopically inserted in each other, its total diameter, and thus also the drive pinion hub and pinion diameter, may be reduced without loss of strength, or given the same diameter, increased torque can be transmitted.

In spite of the one-piece shaft construction, the necessary length variation can be achieved because the shaft is mounted longitudinally displaceable in the hub of the driving member of the cardan joint. Furthermore, as the ring of the coupling member is disposed between the driving and the driven member of the cardan joint, i.e., the coupling member can be close to the hub of the drive pinion, the displacement of the cardan shaft within the hub is reduced, i.e., for a given hub length the pivot angle can be increased or for a given pivot angle the hub can be shortened, or its internal diameter reduced.

A further increase of the available cardan shaft pivot angle can be obtained if, in accordance with the invention, the hub of the drive pinion comprises a bore widening conically towards the hub end remote from the cardan joint.

Finally, the pivoting of the cardan shaft is also facilitated if the ring of the coupling member is formed on the inside as a double cone widening towards the end faces.

DESCRIPTION OF THE DRAWING

In the drawing,

FIG. 1 is an end elevational view, partly in section taken along the line I—I of FIG. 2, of a universal drive in accordance with the invention; and FIG. 2 is an elevational view, partly in section, taken on the line II—II.

DESCRIPTION OF THE PREFERRED EMBODIMENT

The drive pinion 1 of the distributor gear has a hollow hub 2 through which the cardan shaft 3 passes, the first joint of the cardan shaft 3 on the engine side not being illustrated. The cardan shaft 3 is connected rearwards with the hollow revoluble gear hub 2 of the drive pinion 1 via the second cardan joint 4. The cardan joint 4 is shown in the drawing, half in section and half in elevation. The end 5 of the cardan shaft 3 is in rotational driving engagement with the hub 6 of the driving member 7 of the cardan joint 4 but is longitudinally displaceable.

The coupling means of the cardan joint 4 includes a ring 8 which surrounds the driving member hub 6 with clearance, and which is equipped with four radial outer studs 9 disposed in a cross-like manner. Said outer studs 9 are rotatably mounted in four pedestals 10, one opposed pair of which is secured to the driving member 7, the other opposed pair of pedestals 10 being secured to the driven member 11 of the cardan joint 4. The driven member 11 is mounted, fixed in rotation, on the extended hub 2 of the drive pinion 1. Thus, the driving torque is first transmitting from the driving member 7 to the coupling ring 8 by one set of engaged pairs of studs 9 and pedestals 10 mounted on the ring and driving member 7 respectively, and is then transmitted from the coupling ring 8 to the driven member 11 by the second set of engaged pairs of studs 9 and pedestals 10 mounted on the ring 8 and driven member 11, respectively. It is also apparent that the driven member 11 of the cardan joint 4 is disposed on the gear side of the ring 8 equipped with studs 9, and the driving member 7 is on the opposite side of the coupling means.

The hub 2 of the drive pinion 1 comprises a bore 12 which widens conically towards the hub end remote from the cardan joint 4. The ring 8 of the coupling means is made on the inside in the form of a double cone, widening from the center towards the end faces of the hub 2. In this manner a relatively large pivot angle of the cardan shaft 3 within the hub 2 is made possible.

We claim:

1. In a universal joint transmission for use in connection with a distributor gear drive,
in combination,
a drive shaft of unitary construction,
a universal joint in driving engagement with said drive shaft, said universal joint including a driving member, a driven member and a universal joint coupling means therebetween,
said driven member comprising a hub revoluble about a rotational axis and being hollow on the interior and open at both axial ends and having on the exterior a portion circumferential about said axis;
said coupling means comprising a ring, surrounding with its inner circumference said driving member and defining therewith a clearance gap, said ring having four projecting radial studs equally spaced around its outer circumference, thereby comprising a first and second pair of radially opposed projecting radial studs;
said driving member comprising a sleeve-like hub passing through the center of said ring defining therewith said clearance gap, said sleeve-like hub being in longitudinally movable and rotational driving engagement with said driving shaft whose end is received within said sleeve-like hub;
said driven member and said driving member being on opposite sides of said coupling means;
said driven member, said distributor gear drive, and said drive shaft being on the same side of said coupling means;
a first pair of radially opposed pedestals, fastened to said sleeve-like hub and adapted to rotationally engage said first radially opposed pair of said projecting radial studs, whereby a driving torque is transmitted from said sleeve-like hub to said ring;
a second pair of radially opposed pedestals, fastened to said portion of said driven member and adapted to rotationally engage said second radially opposed pair of said projecting radial studs, whereby a driving torque is transmitted from said ring to said driven member;
said distributor gear drive comprising a driving gear including a hollow revoluble gear hub in driving connection with said hub of said driven member, the interiors of both said hubs being adjacent to, and communicating with, each other, and said driving shaft passing through the interiors of said hubs; and
the interior of said gear hub defining a bore widening conically away from said universal joint.

2. A universal joint transmission, as claimed in claim 1, said ring being formed on the inside as a double cone widening towards the end faces thereof.

* * * * *